Sept. 25, 1923.
C. O. BROWNELL
WRAPPING MACHINE
Filed Jan. 3, 1921
1,468,626
10 Sheets-Sheet 2
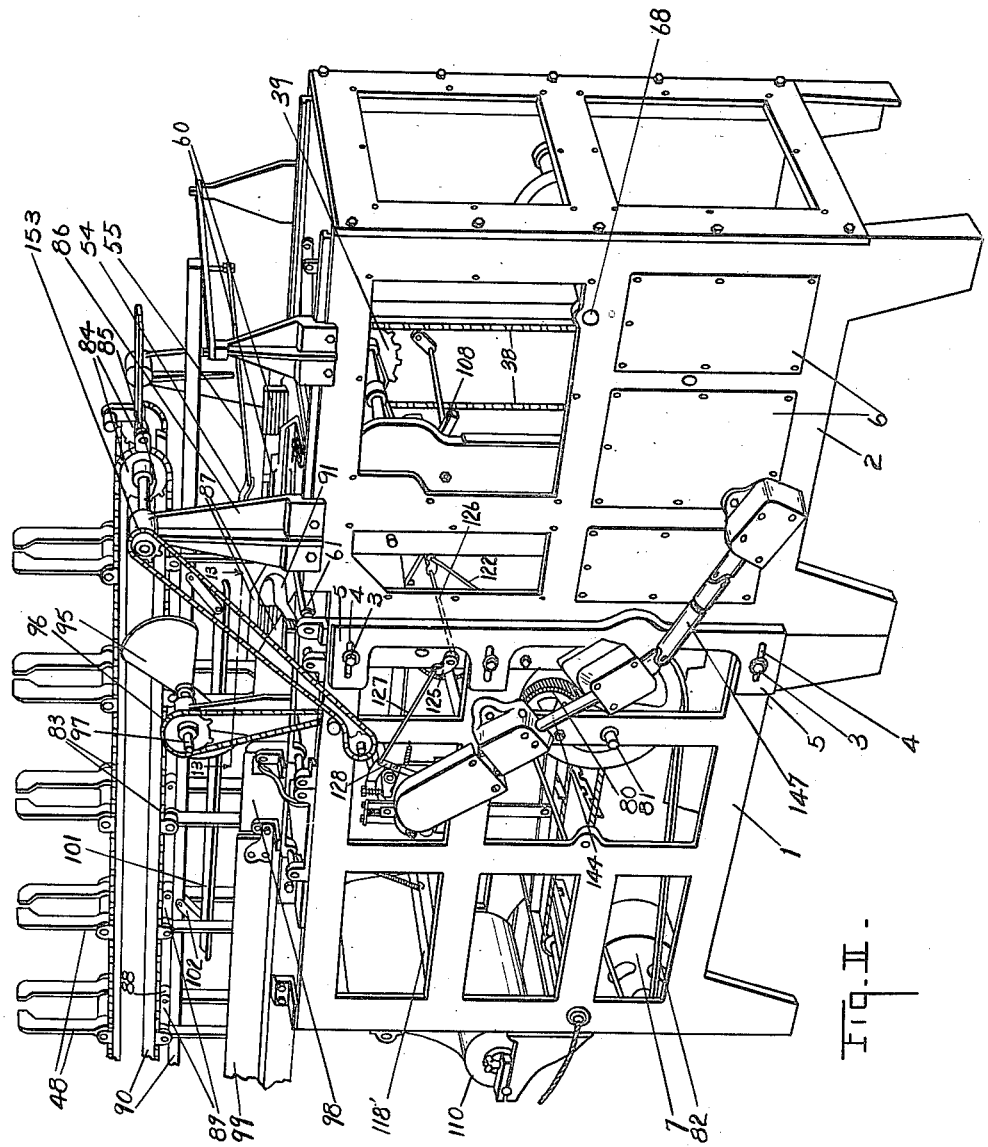
Fig. II.
Witnesses
Renn Gilman
M. Louise Thurston
Inventor
Charles O. Brownell
By Chappell & Earl
Attorneys

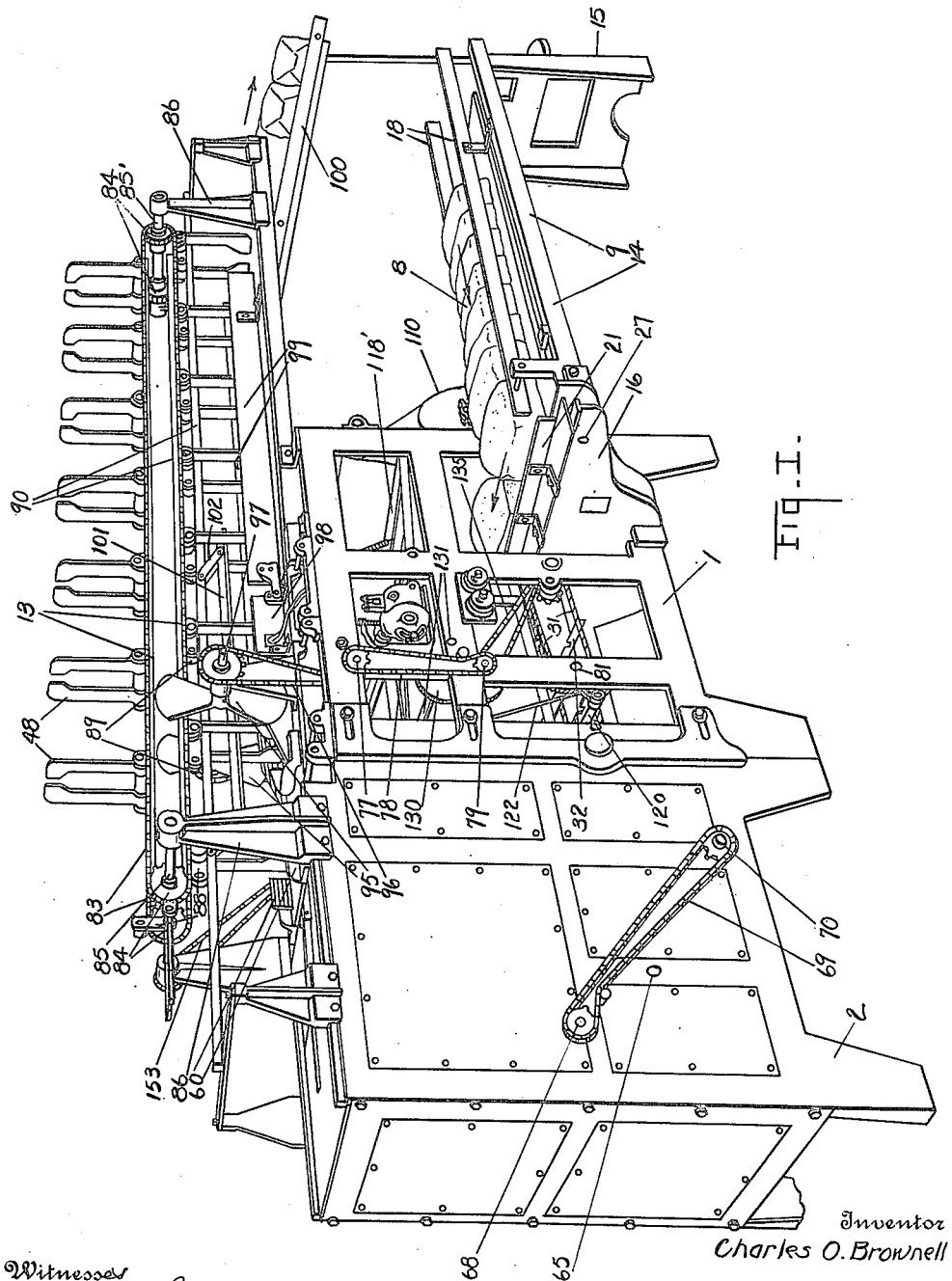

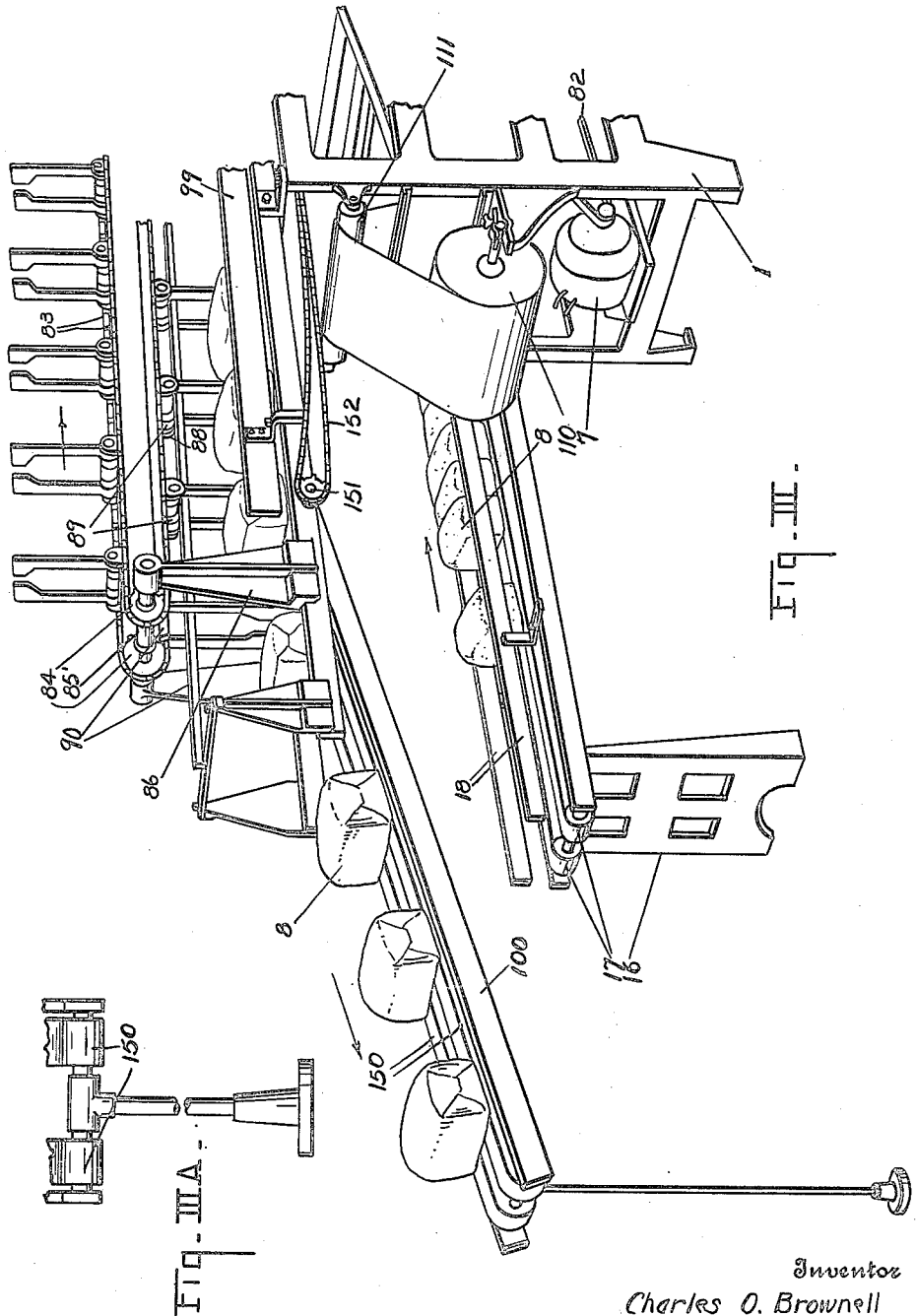

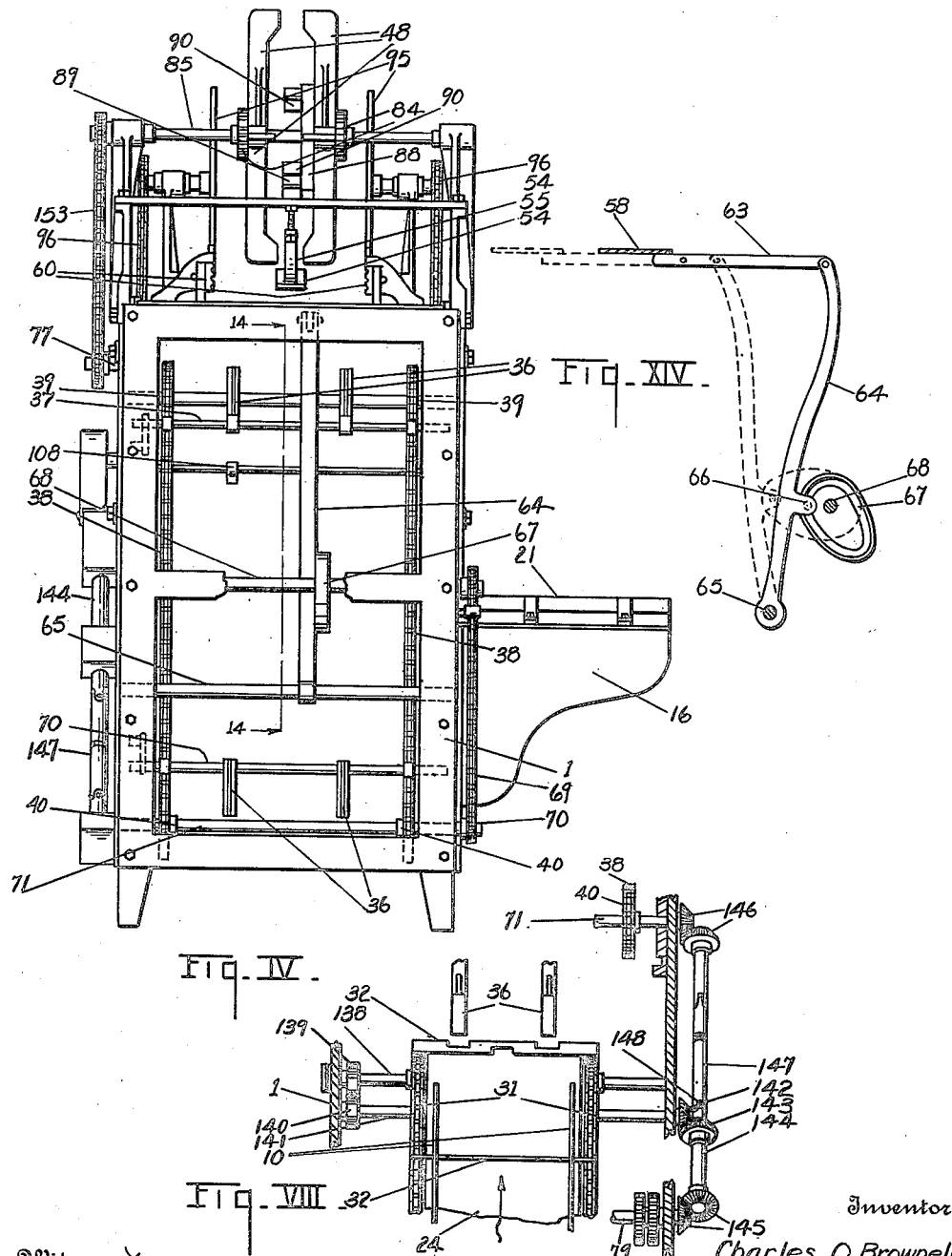

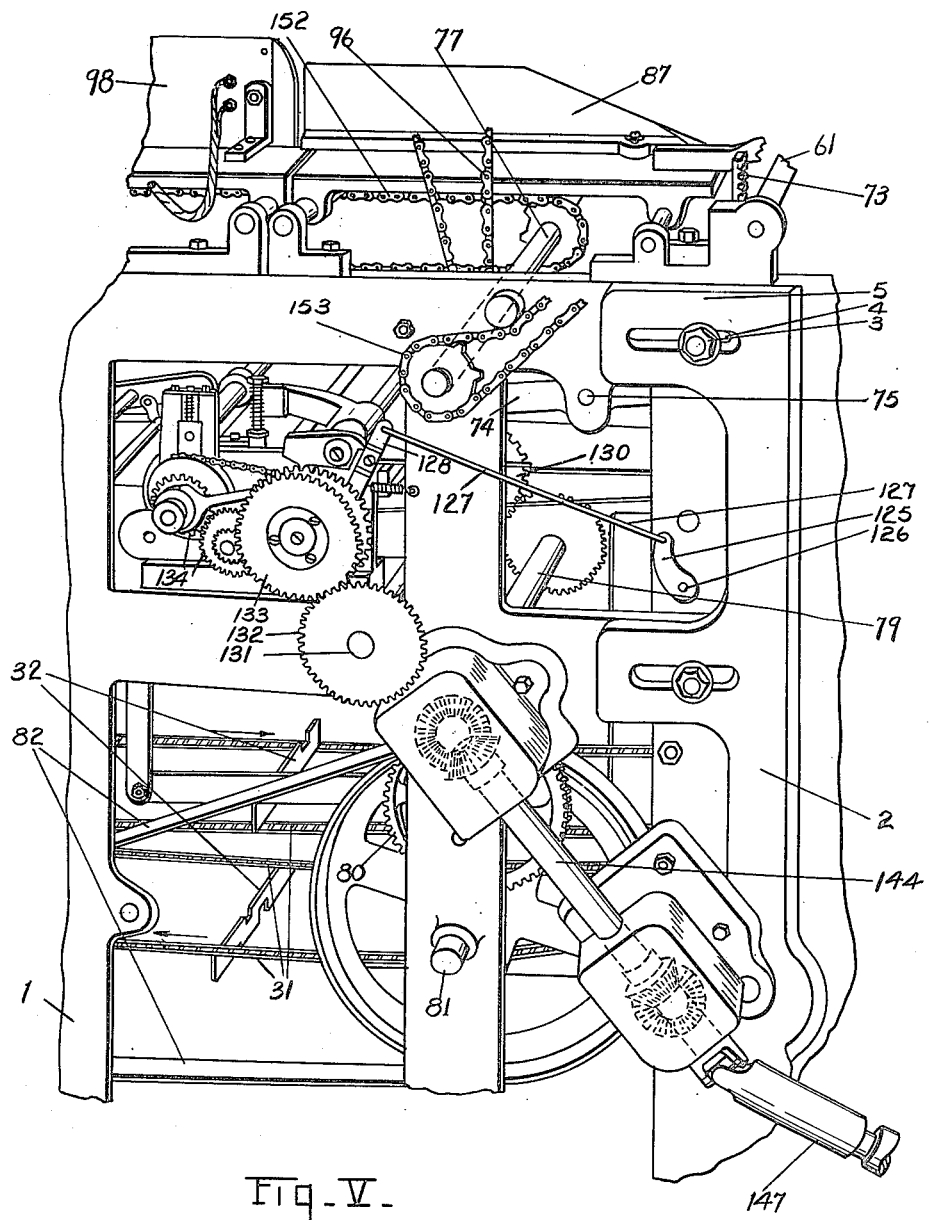

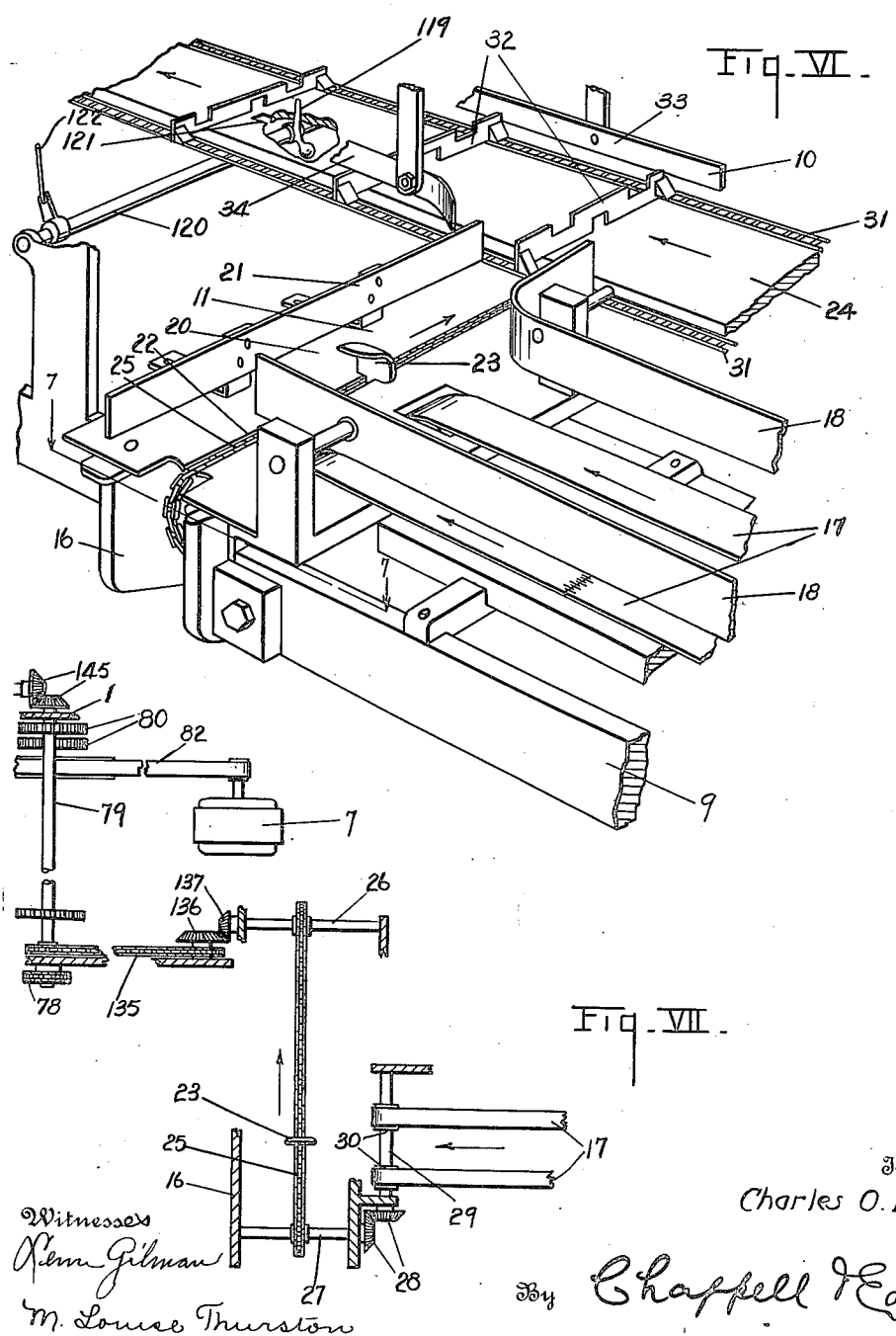

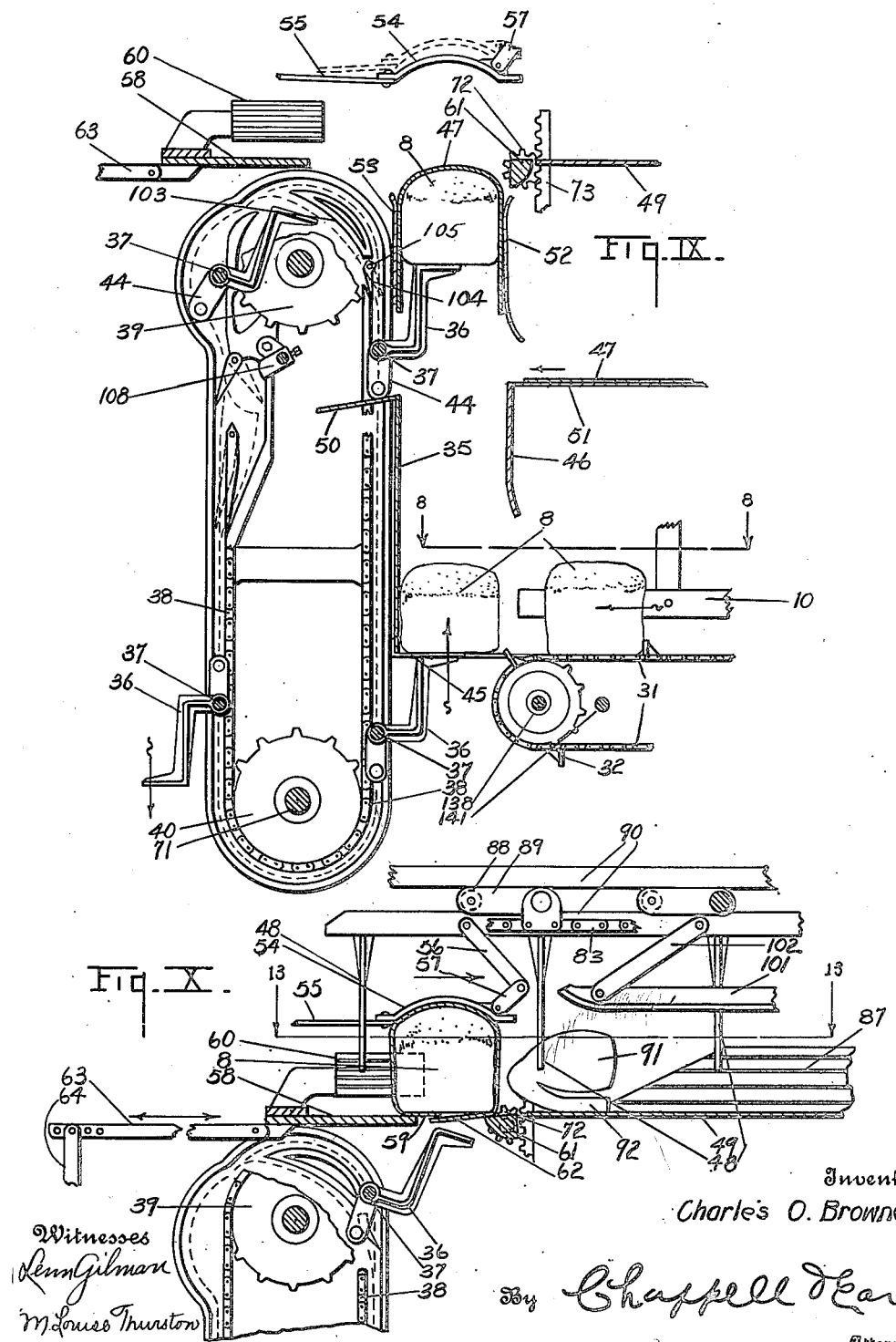

Sept. 25, 1923.                C. O. BROWNELL                1,468,626
                                WRAPPING MACHINE
                          Filed Jan. 3, 1921    10 Sheets-Sheet 8
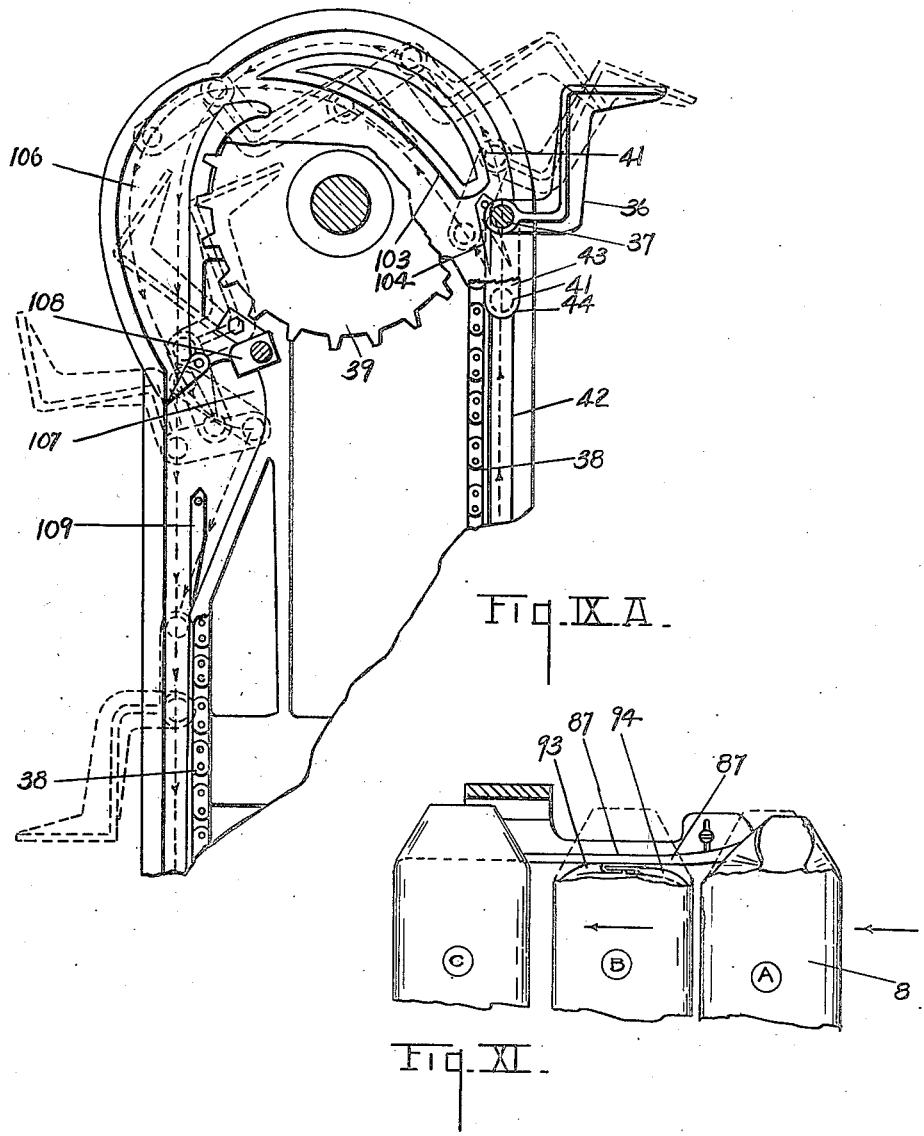
Witnesses
Kenn Gilman
M. Louise Thurston
Inventor
Charles O. Brownell
By Chappell & Earl
Attorneys

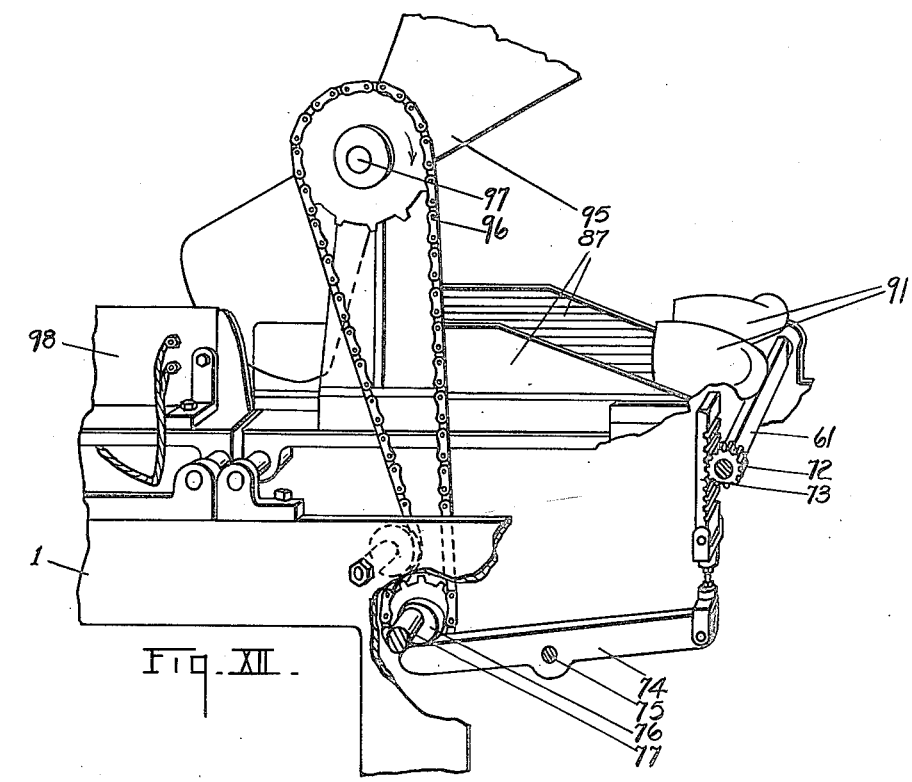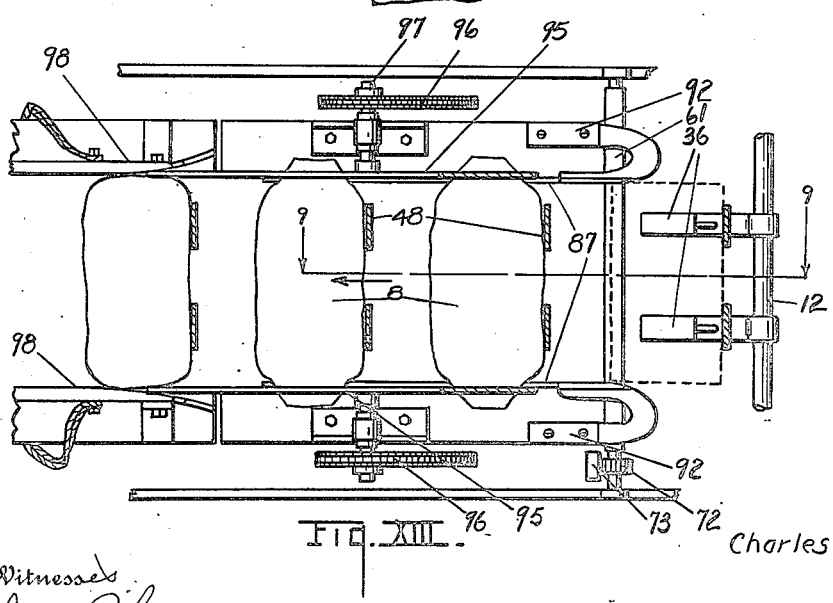

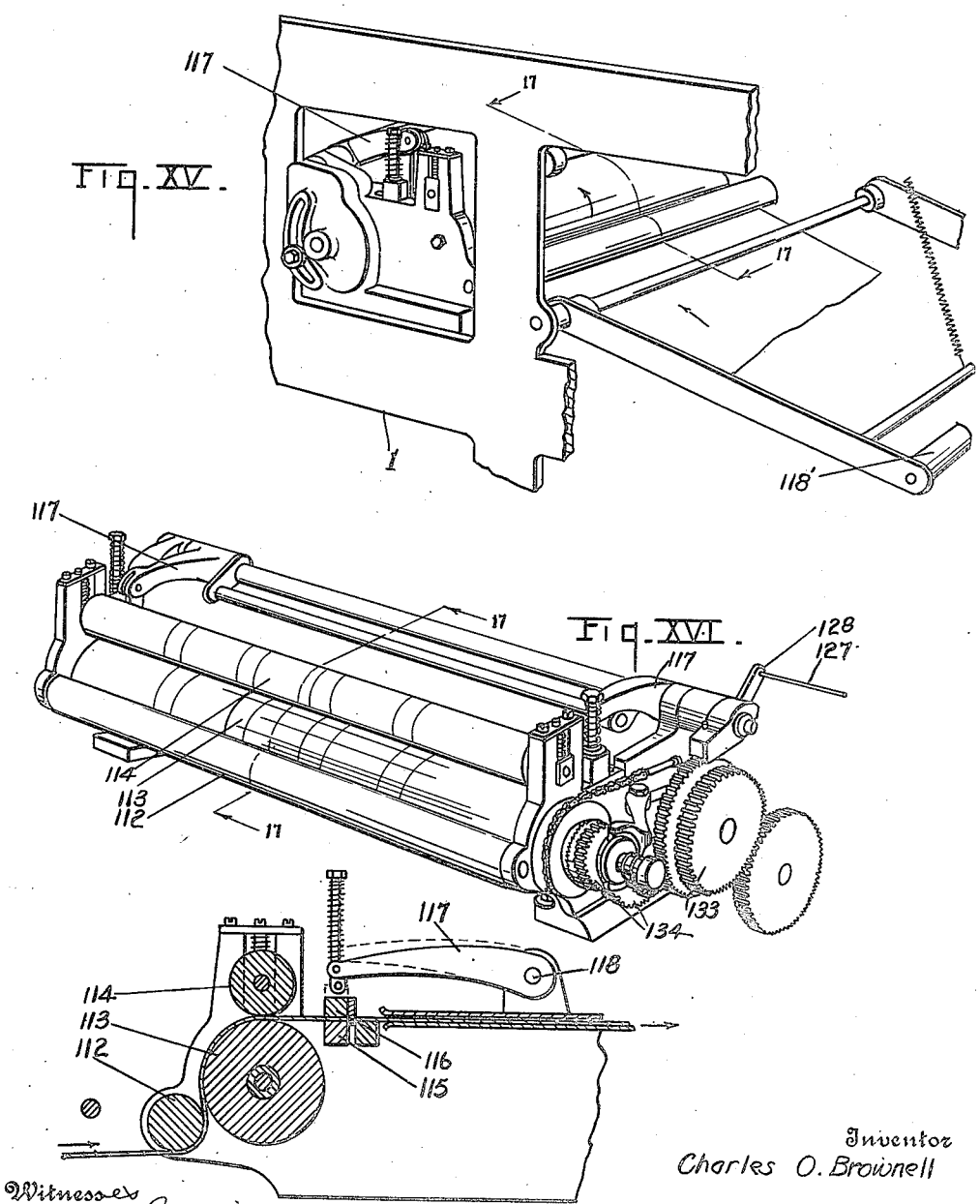

Patented Sept. 25, 1923.

1,468,626

UNITED STATES PATENT OFFICE.

CHARLES O. BROWNELL, OF BATTLE CREEK, MICHIGAN, ASSIGNOR TO BATTLE CREEK BREAD WRAPPING MACHINE CO., OF BATTLE CREEK, MICHIGAN, A CORPORATION OF MICHIGAN.

WRAPPING MACHINE.

Application filed January 3, 1921. Serial No. 434,675.

*To all whom it may concern:*

Be it known that I, CHARLES O. BROWNELL, a citizen of the United States, residing at Battle Creek, county of Calhoun, State of Michigan, have invented certain new and useful Improvements in Wrapping Machines, of which the following is a specification.

This invention relates to improvements in wrapping machines.

My improvements are especially designed by me and I have illustrated the same as embodied in machines for wrapping bread. My improvements are, however, capable of embodiment and various features are desirable when embodied in machines for wrapping other articles.

The main objects of this invention are:

First, to provide an improved wrapping machine which is quite compact and at the same time of large capacity.

Second, to provide in a wrapping machine an improved means for carrying the articles into the machine and through the wrapping mechanism and delivering the wrapped articles.

Third, to provide an improved wrapping machine which is well adapted for the handling of comparatively delicate objects such as loaves of bread.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a perspective view of the left hand side of a wrapping machine embodying the features of my invention.

Fig. II is a perspective view of the right hand side of my improved wrapping machine, parts of the front end being broken away.

Fig. III is a detail perspective view of the front end of the machine from the right hand side thereof.

Fig. III^A is a detail elevation of the front end of the delivery chute.

Fig. IV is a rear elevation with the end housing panels shown in Fig. I removed.

Fig. V is an enlarged detail perspective view of the right hand side of the machine illustrating the driving connections for the cenveyors and the folding and wrapping mechanisms.

Fig. VI is a detail perspective view of the article feed mechanism.

Fig. VII is a detail plan view on a line corresponding to line 7—7 of Fig. VI showing the parts of the article feed mechanism shown in Fig. VI illustrating particularly the driving means for the parts therein shown.

Fig. VIII is a detail view partially in section on a line corresponding to line 8—8 of Fig. IX illustrating further details of the article feed mechanism.

Fig. IX is a detail vertical section on a line corresponding to line 9—9 of Fig. XIII, showing details of the transfer or elevating conveyor by which the articles are transferred from the feed mechanism to the wrapping and sealing conveyor.

Fig. IX^A is an enlarged detail section corresponding to that of Fig. IX illustrating the coacting relation and movement of the parts, various positions assumed by the parts in their movements being indicated by dotted lines.

Fig. X is a detail view partially in vertical section corresponding to Fig. IX, showing the parts in the initial wrapping position.

Fig. XI is a detail plan view illustrating certain steps of the folding of the top flaps, the top flap in first two positions illustrated being broken away but indicated by dotted lines.

Fig. XII is a detail perspective view of certain of the flap folders.

Fig. XIII is a detail horizontal section on a line corresponding to line 13—13 of Figs. II and X, showing details of the folding mechanism.

Fig. XIV is a detail vertical section on a line corresponding to line 14—14 of Fig. IV showing further details of the folding or wrapping mechanism.

Fig. XV is a detail perspective view of the paper feed mechanism.

Fig. XVI is a perspective view of the paper feed roll and cutter.

Fig. XVII is a detail vertical section on a line corresponding to line 17—17 of Figs. XV and XVI.

In the drawing similar reference characters refer to similar parts throughout the several views, and the sectional views are taken looking in the direction of the little arrows at the ends of the section lines.

Referring to the drawing, the frame of the machine is preferably formed of two main parts 1 and 2, each consisting of side and cross members arranged to provide rigid supports for various shafts, ways and movable parts. The two frame members are detachably connected by means of the bolts 3 arranged through slots 4 in the overlapping arms 5. The details of the frame form no part of this invention and they are therefore not further described herein.

The frame member 2 is preferably provided with panels 6. I preferably drive my machine by means of an electric motor shown conventionally at 7, the motor being mounted in the lower part of the frame. The loaves of bread 8 or other articles to be wrapped are introduced and also discharged from the front end of the machine. The articles are conveyed to the machine by the supply conveyor designated generally by the numeral 9 from which they are shifted to the feed conveyor designated generally by the numeral 10 by the shifter designated generally by the numeral 11.

The articles are delivered by the feed conveyor 10 to the elevating conveyor by which they are delivered to the wrapping and sealing conveyor designated generally by the numeral 13. The conveyor 9 consists of a frame 14 supported at its front end by the standard 15 and at its rear end by the bracket 16 on the main frame of the machine.

The articles 8 are placed upon the conveyor belts 17 by an operator or as may be desired, by belts traveling between the side bars 18 so that the articles are carried along by the belts and delivered thereby onto the shifter way or table 20. A stop bar 21 is disposed opposite to the belts 17 so that the articles are delivered against the same.

The table or way 20 has a slot 22 through which the flights 23 project to engage the articles and push them along the table 20 onto the slide way 24 of the feed conveyor 10.

The flights 23 are mounted on sprocket chain 25 supported by sprockets on the shafts 26 and 27—see Fig. VII.

The shaft 27 is connected by the pinions 28 to the shaft 29 having pulleys 30 thereon for the belts 17 so that these belts are driven through the conveyor chain 25. The feed conveyor 10 is provided with sprocket chains 31 disposed at the sides of the way 24 and carrying flights 32 which travel on their forward reach above the way and push the articles along thereon. Side bars 33 and 34 are provided to guide the articles as they are carried along by the flights.

The articles 8 are delivered by the conveyor 10 against the stop bars 35 in which position they are engaged by the arm-like flights 36 of the elevating conveyor 12. These flights 36 are mounted on rods or rock shafts 37 carried by the conveyor chains 38 on the sprocket wheels 39 and 40—see Fig. IX. These rock shafts are provided with rollers 41 traveling in cam ways 42, the rock shafts being also provided with arms 43 having rollers 44 traveling in these cam ways, the cam ways being arranged so that the flights 36 are supported in an upright position on their ascending movement, engaging the articles as they are supported by the bars 45 to which they are delivered by the feed conveyor carrying them upward between the bars 35 and the guide plate 46—see Fig. IX. The feed conveyor carries the articles to the position shown in Fig. X in which position the articles engages a sheet of wrapping paper 47 and the wrapper receives its initial wrapping. The articles are then engaged by the flights 48 of the sealing conveyor and carried upon the slide way 49 of the sealing conveyor.

The wrapping sheets 47 are carried across the path of the articles as they are elevated by the elevating conveyor, one edge of the sheets being supported by the fingers 50 and the other by the paper feed table 51, the articles engaging the sheets from their undersides. The sheets are wrapped across the top and about the sides thereof as they are elevated and carried between the wrapping members 52 and 53 which wrap the paper over the top and sides as shown in Fig. IX.

As the articles reaches the elevated position shown in Fig. X, it is engaged by the wrapper holder 54 yieldably supported by the arm 55 and the links 56 and 57. When the article reaches this position, it is engaged by the rear bottom folder 58 which folds the bottom flap 59 under the article as shown in Fig. X. This folder is also provided with rear end flap folders 60 which fold the rear end flaps forwardly.

A front bottom flap folder 61 is arranged to engage the front bottom flap 62 and fold it rearwardly over the rear bottom flap 59 as shown in Fig. X. As the article is engaged by the flap folders, the flight 36 drops away leaving the article supported by the folders until it is carried on to the slide ways 49 of the wrapping and sealing conveyor.

The rear flap folders 58 and 60 are connected by the link 63 to an actuating lever 64 pivoted at 65 and provided with a pin 66 engaging the grooved cam 67 on the shaft 68. This shaft 68 is connected by the sprocket chain 69 and suitable sprocket wheels to the shaft 70 on which the sprocket wheels 40 for the elevating conveyor chains are mounted—see Figs. I and IV.

The flap folder 61 is actuated by the pinion 72 and the rack 73. The rack 73 is actuated by the lever 74 pivoted at 75 and actuated by a cam 76 on the shaft 77 connected by the sprocket chain 78 and suitable sprockets to the shaft 79 which is connected by the train of gears 80 to the main drive 81 connected by the belts 82 to the motor 7—see Figs. IX, X, and XII.

As the folder 61 completes its operation, the article is engaged by one of the flights 48 of the wrapping and sealing conveyor 13. The sprocket chains 83 carrying these flights are mounted on sprockets 84 carried by shafts 85 and 85′ on the pedestals 86 so that the sprocket chains are supported above the way 49 and the flights swing over the article in its initial wrapping position as shown in Fig. X, pushing it along on the way 49 between the flap folders and side plates. The flights are provided with arms 88, the arms and flights having rollers 89 traveling between guides 90 while the flights are on the lower reach of their travel so that they are supported in a vertical position.

As the articles are carried along by the flights 48, the forward end flaps are engaged by the stationary flap folders 91 positioned at the sides of the conveyor. These flap folders are supported by arms 92. The bottom end flaps are then engaged by the bottom flap folders 87 which turn the same upwardly against the folded forward and rear end flaps 93 and 94. The top end flaps are then engaged by the rotary flap folders 95 and folded down upon the folded bottom flaps, the several steps being illustrated in Fig. XI, (A) indicating the position of the flaps after passing the folder 91, and (B) after passing the folder 93.

The rotary flap folders 95 are driven by the sprocket chain 96 and suitable sprockets from the shaft 77—see Fig. XII. As the wrapped articles are further advanced they come into contact with the sealing plates 98 and are then carried between the cooling plates 99 and discharged onto the chute 100.

To hold the article to the way and prevent creeping of the wrapper thereon as it is acted upon by the folders, I provide a floating bar 101 which is supported by the links 102 above the way 49 so as to engage the tops of the wrapper.

I will now describe in detail the means by which the flights of the elevating conveyor are controlled so that they drop away or fall away from the article when it has reached its initial wrapping position as shown in Fig. X and so that the flights do not interfere with the operation of the bottom folders which as stated not only serve the purpose of folders but also support the article until it is moved along on the way 49.

The guide ways 42 for the rollers 44 of the flights have vertical side portions and curved end portions as shown in Fig. IX. At the upper end of the guide way 42 is a switch way 103 controlled by the switch 104 pivoted at 105. As the flights travel upwardly to the position shown in Figs. IX$^A$ and X the rollers on the rock shafts 37 engage the switch 104 swinging it across the way 42 so that the roller on the arm 43 is guided by the switch 104 into the switch way 103. This tilts the flight rock shaft dropping the flight downwardly and away from the article as shown in Fig. X. The continued movement of the flight tilts it still further as shown by dotted lines in Fig. IX$^A$ so that it passes from below the article.

As the flight supporting rock shaft is carried over the upper sprocket 39, the roller on the rock shaft and arm pass into the way enlargement 106 at the upper end of the downward reach or travel of the flights. The purpose of this way enlargement 106 is to permit the flights to tilt still further and thereby economize in the space required for the conveyor.

I provide the way with a reversing space 107 adapted to permit the swinging of the arm 43 when the flight engages the stop 108 and is reversed thereby as indicated by dotted lines in Fig. IX$^A$.

To prevent a rebound and the vibrations of the rock shaft in the reversing space, I provide a pivoted guide 109 at the bottom of the reversing space 107 so that the roller on the rock shafts passes in front of this guide while the roller on the arm may pass under the same as indicated in Fig. IX$^A$.

With this arrangement of parts, the flights are caused to quickly drop away from the articles when they have reached their wrapping position, and further the conveyor is compact, it being one of the main objects of my invention to provide a structure which is of large capacity and at the same time quite compact.

Furthering this feature of compactness, I arrange the paper feed mechanism between the feed and the sealing conveyors.

The paper roll 110 is mounted at the front of the machine and the paper passed over the guide rolls 111 and 112 between the feed rolls 113 and 114, the roll 113 being a driven roll and the roll 114 a pressure roll. At the rear of the feed rolls are the cutter bar 115 and coacting shear bar 116. The shear bar is carried by the arms 117 on the rock shaft 118. These parts are shown in Figs. XV, XVI and XVII.

A tensioning device 118′ is provided between the roll of paper and the feed rollers—see Fig. XV.

The details for operating the shear bar and driving the feed rolls are not described as they form no part of my present invention. I desire to point out, however, that the feeding of the paper is controlled by the articles on the feed conveyor, a stop 119 on the rock shaft 120 being arranged to project through a slot 121 in the conveyor way 24 so as to be engaged by the articles passing along the way.

This rock shaft 120 is connected by the link 122 to an arm 125 on the rock shaft 126 which is in turn connected by the link 127 to the arm 128 on the control mechanism.

The feed paper mechanism is driven from the shaft 79 having a gear thereon meshing with a gear 130 on the shaft 131. This shaft 131 has a gear 132 meshing with a gear 133 on the feed roller which is one of a train of gears 134 indicated generally by the numeral 134 through which the feed roller 113 is driven. The supply conveyor described is also driven from this shaft 79, a sprocket chain 135 and suitable sprockets connecting the shaft to a beveled gear 136 meshing with a beveled pinion 137 on the shaft 26—see Fig. VII.

The feed conveyor is driven with an intermittent or step by step movement, the driven conveyor shaft 138 being provided with an intermittent gear 139 meshing with an intermittent gear 140 on the shaft 141 which has a beveled gear 142 meshing with the beveled gear 143 on the shaft 144 which is connected by the pinions 145 to the shaft 79—see Figs. V and VIII.

The lower shaft 71 of the elevating conveyor is connected by the beveled gears 146 to the shaft 147 which is connected to the shaft 144 by the universal joint 148.

The discharge chute 100 is provided with belts 150, the pulleys for the upper ends of the belts being supported by the shafts 151 driven by the sprocket chain 152 from the shaft 77.

The driving shaft 85 of the sealing conveyor is connected to the shaft 77 by the sprocket chain 153 and suitable sprockets on the shaft.

Thus connected, the several mechanisms are properly timed or synchronized in their operations so that the machine is entirely automatic, the loaves or other articles to be wrapped being delivered to the supply conveyor 9 from whence they are transferred to the feed conveyor, delivered by the feed conveyor to the elevating conveyor from which it is carried on to the sealing conveyor, through the sealing mechanism, and delivered to the delivery chute.

My improved wrapping and sealing machine is of large capacity and is quite compact. I have not attempted to illustrate or describe certain modifications in structural details which I contemplate as I believe the disclosure made will enable those skilled in the art to which my invention relates to embody or adapt the same as may be desired.

Having thus described my invention, what I claim as new and desire to secure by Letters Patent is:

1. In a wrapping machine, the combination with a supporting frame, of a feed conveyor disposed longitudinally of said frame and comprising a way and conveyor chains driven with a step by step movement and provided with flights adapted to push the articles along said way, a supply conveyor disposed parallel to said feed conveyor, a shifting way disposed at the rear end of said supply conveyor to receive the articles therefrom and in the plane of said feed conveyor way, a shifting conveyor chain provided with flights adapted to push the articles from said shifting way to said feed conveyor way between the feed conveyor flights, an elevating conveyor disposed at the rear of said feed conveyor and provided with flights adapted to engage the articles delivered by said feed conveyor, wrapping means comprising folder members adapted to support the articles, a wrapping and sealing conveyor disposed above said feed conveyor and comprising a slide way and conveyor chains disposed above said slide way and provided with flights adapted to engage the articles while supported by said folder members and carry them upon and along said sealing conveyor way toward the front end of the machine, and a paper feed mechanism mounted between said feed and sealing conveyors to deliver the paper from the front end of the machine so that it is engaged by the articles as they are elevated to said sealing conveyor.

2. In a wrapping machine, the combination with a supporting frame, of a feed conveyor disposed longitudinally of said frame and comprising a way and conveyor chains driven with a step by step movement and provided with flights adapted to push the articles along said way, a supply conveyor disposed parallel to said feed conveyor, a shifting way disposed at the rear end of said supply conveyor to receive the articles therefrom and in the plane of said feed conveyor way, a shifting conveyor chain provided with flights adapted to push the articles from said shifting way to said feed conveyor way between the feed conveyor flights, an elevating conveyor disposed at the rear of said feed conveyor and provided with flights adapted to engage the articles delivered by said feed conveyor, wrapping means comprising folder members adapted to support the articles, and a wrapping and sealing conveyor disposed above said feed conveyor and comprising a slide way and conveyor chains disposed above said slide way and provided with flights adapted to engage the articles while supported by said folder members and carry them upon and along said sealing conveyor way toward the front end of the machine.

3. In a wrapping machine, the combination with a supporting frame, of a feed conveyor disposed longitudinally of said frame and comprising a way and conveyor chains driven with a step by step movement and provided with flights adapted to push the articles along said way, an elevating conveyor disposed at the rear of said feed conveyor and provided with flights adapted to engage the articles delivered by said feed conveyor, wrapping means comprising folder members adapted to support the articles, a wrapping and sealing conveyor disposed above said feed conveyor and comprising a slide way and conveyor chains disposed above said slide way and provided with flights adapted to engage the articles while supported by said folder members and carry them upon and along said sealing conveyor way toward the front end of the machine, and a paper feed mechanism mounted between said feed and sealing conveyors to deliver the paper from the front end of the machine so that it is engaged by the articles as they are elevated to said sealing conveyor.

4. In a wrapping machine, the combination with a supporting frame, of a feed conveyor disposed longitudinally of said frame and comprising a way and conveyor chains driven with a step by step movement and provided with flights adapted to push the articles along said way, an elevating conveyor disposed at the rear of said feed conveyor and provided with flights adapted to engage the articles delivered by said feed conveyor, wrapping means comprising folder members adapted to support the articles, and a wrapping and sealing conveyor disposed above said feed conveyor and comprising a slide way and conveyor chains disposed above said slide way and provided with flights adapted to engage the articles while supported by said folder members and carry them upon and along said sealing conveyor way toward the front end of the machine.

5. In a wrapping machine, the combination with a supporting frame, of a feed conveyor disposed longitudinally of said frame and comprising a slide way and conveyor chains driven with a step by step movement and provided with flights, a supply conveyor disposed parallel to said feed conveyor, a shifting way disposed at the rear end of said supply conveyor to receive the articles therefrom and in the plane of said feed conveyor way, a shifting conveyor chain provided with flights adapted to push the articles from said shifting way to said feed conveyor way between the feed conveyor flights, an elevating conveyor disposed at the rear of said feed conveyor and provided with flights adapted to engage the articles delivered by said feed conveyor, wrapping means comprising folder members adapted to support the articles, a wrapping and sealing conveyor disposed above said feed conveyor and comprising flights adapted to engage the articles while supported by said folder members and carry them upon and along said sealing conveyor way toward the front end of the machine, and a paper feed mechanism mounted between said feed and sealing conveyors to deliver the paper from the front end of the machine so that it is engaged by the articles as they are elevated to said sealing conveyor.

6. In a wrapping machine, the combination with a supporting frame, of a feed conveyor disposed longitudinally of said frame and comprising a slide way and conveyor chains driven with a step by step movement and provided with flights, a supply conveyor disposed parallel to said feed conveyor, a shifting way disposed at the rear end of said supply conveyor to receive the articles therefrom and in the plane of said feed conveyor way, a shifting conveyor chain provided with flights adapted to push the articles from said shifting way to said feed conveyor way between the feed conveyor flights, an elevating conveyor disposed at the rear of said feed conveyor and provided with flights adapted to engage the articles delivered by said feed conveyor, wrapping means comprising folder members adapted to support the articles, and a wrapping and sealing conveyor disposed above said feed conveyor and comprising flights adapted to engage the articles while supported by said folder members and carry them upon and along said sealing conveyor way toward the front end of the machine.

7. In a wrapping machine, the combination of a feed conveyor, an elevating conveyor to which said feed conveyor delivers comprising sprocket chains and supporting and driving sprockets therefor, rods pivotally mounted on said sprocket chains, angled flights mounted on said rods, arms on said rods, said rods and arms being provided with rollers, a guide way for said rollers having a switch way at the end of the upward reach thereof, a switch for said switch way disposed to be actuated by the rollers on said rods whereby the switch guides the rollers on said arms into said switch way to rock said rods and swing said flights downwardly, said guide way also having a reversing space on the downward reach thereof permitting the swinging of said arms, a reversing stop positioned at the upper end of said reversing space to engage the flights as they are carried downwardly whereby they are reversed, feed means adapted to position the articles to be engaged by said flights on the upward stroke thereof, and folding members positioned to engage the articles when they are released by said flights.

8. In a wrapping machine, the combination of a feed conveyor, an elevating conveyor to which said feed conveyor delivers comprising sprocket chains and supporting and driving sprockets therefor, rods pivotally mounted on said sprocket chains, tangled flights mounted on said rods, arms on said rods, said rods and arms being provided with rollers, a guide way for said rollers having a switch way at the end of the upward reach thereof, a switch for said switch way disposed to be actuated by the rollers on said rods whereby the switch guides the rollers on said arms into said switch way to rock said rods and swing said flights downwardly, said guide way also having a reversing space on the downward reach thereof permitting the swinging of said arms, a reversing stop positioned at the upper end of said reversing space to engage the flights as they are carried downwardly whereby they are reversed, and feed means adapted to position the articles to be engaged by said flights on the upward stroke thereof.

9. In a wrapping machine, the combination of a feed conveyor, an elevating conveyor to which said feed conveyor delivers comprising sprocket chains and supporting and driving sprockets therefor, rods pivotally mounted on said sprocket chains, angled flights mounted on said rods, arms on said rods, said rods and arms being provided with rollers, a guide way for said rollers having a switch way at the end of the upward reach thereof, a switch for said switch way disposed to be actuated by the rollers on said rods whereby the switch guides the rollers on said arms into said switch way to rock said rods and swing said flights downwardly, said guide way also having a reversing space on the downward reach thereof permitting the swinging of said arms, a reversing stop positioned at the upper end of said reversing space to engage the flights as they are carried downwardly whereby they are reversed, pivoted rebound guides mounted in said reversing space to coact with the rollers on said rods and arms, feed means adapted to position the articles to be engaged by said flights on the upward stroke thereof, and folding members positioned to engage the articles when they are released by said flights.

10. In a wrapping machine, the combination of a feed conveyor, an elevating conveyor to which said feed conveyor delivers comprising sprocket chains and supporting and driving sprockets therefor, rods pivotally mounted on said sprocket chains, flights mounted on said rods, arms on said rods, a guide way for said arms having a switch way at the end of the upward reach thereof, a switch for said switch way disposed to be actuated by said rods whereby the switch guides the said arms into said switch way to rock said rods and swing said flights downwardly, said guide way also having a reversing space on the downward reach thereof permitting the swinging of said arms, a reversing stop positioned to engage the flights as they are carried downwardly, said guide way also having a reversing space on the downward reach thereof permitting the swinging of said arms, a reversing stop positioned to engage the flights as they are carried downwardly whereby they are reversed, pivoted rebound guides mounted in said reversing space to coact with said rods and arms, feed means adapted to position the articles to be engaged by said flights on the upward stroke thereof, and folding members positioned to engage the articles when they are released by said flights.

11. In a wrapping machine, the combination of a feed conveyor, an elevating conveyor to which said feed conveyor delivers comprising sprocket chains and supporting and driving sprockets therefor, rods pivotally mounted on said sprocket chains, flights mounted on said rods, arms on said rods, a guide way for said arms having a switch way at the end of the upward reach thereof, a switch for said switch way disposed to be actuated by said rods whereby the switch guides the said arms into said switch way to rock said rods and swing said flights downwardly, a reversing means for said flights positioned at the rear of said switch, feed means adapted to position the articles to be engaged by said flights on the upward stroke thereof, and folding members positioned to engage the articles when they are released by said flights.

12. In a wrapping machine, the combination of a feed conveyor, an elevating conveyor to which said feed conveyor delivers comprising sprocket chains and supporting and driving sprockets therefor, rods pivotally mounted on said sprocket chains, flights mounted on said rods, arms on said rods, a guide way for said arms having a switch way at the end of the upward reach thereof, a switch for said way disposed to be actuated by said rods whereby the switch guides the said arms into said said switch way to rock said rods and swing said flights downwardly, said guide way also having a reversing space on the downward reach thereof permitting the swinging of said arms, a reversing stop positioned to engage the flights as they are carried downwardly whereby they are reversed, and pivoted rebound guides mounted in said reversing space to coact with the said rods and arms.

13. In a wrapping machine, the combination of a feed conveyor, an elevating conveyor to which said feed conveyor delivers comprising sprocket chains and supporting and driving sprockets therefor, rods pivotally mounted on said sprocket chains, flights mounted on said rods, arms on said rods, a guide way for said arms having a switch way at the end of the upward reach thereof, a switch for said switch way disposed to be actuated by said rods whereby the switch guides the said arms into said switch way to rock said rods and swing said flight downwardly, and a reversing means for said flights positioned at the rear of said switch.

In witness whereof, I have hereunto set my hand and seal in the presence of two witnesses.

CHARLES O. BROWNELL. [L. S.]

Witnesses:
 JOHN R. SALLOWS,
 WALTER S. POWERS.